Feb. 13, 1962     G. T. PARISH     3,020,757
MARINE SPEEDOMETER

Filed Feb. 1, 1960     2 Sheets-Sheet 1

INVENTOR.
GENE T. PARISH
BY
ATTORNEYS

Feb. 13, 1962 G. T. PARISH 3,020,757
MARINE SPEEDOMETER
Filed Feb. 1, 1960
2 Sheets-Sheet 2
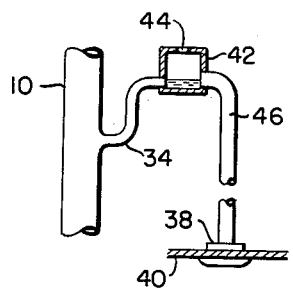
FIG. 3
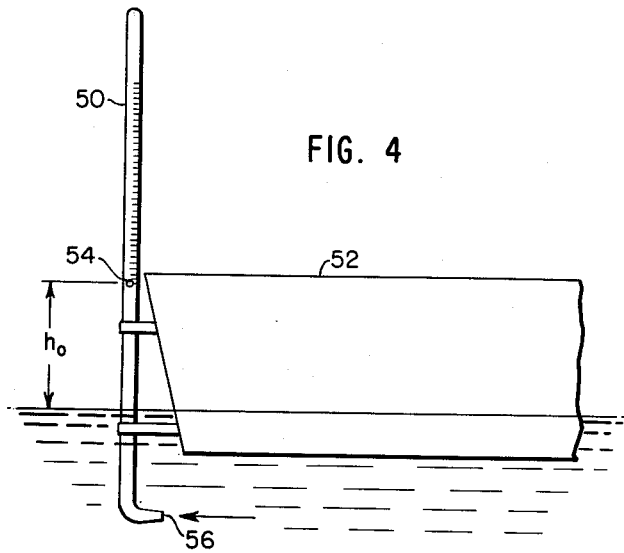
FIG. 4
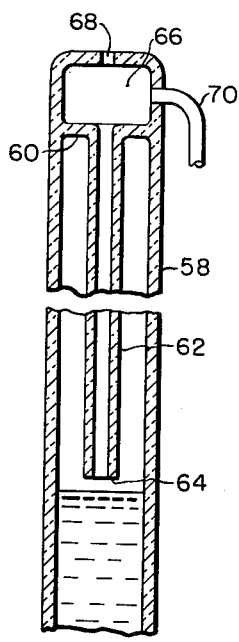
FIG. 6
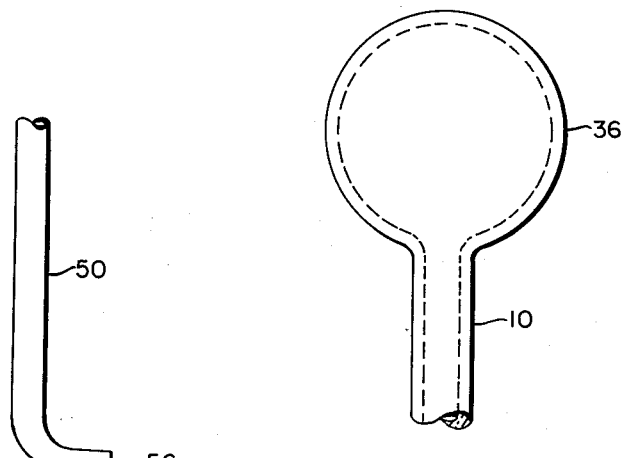
FIG. 5
FIG. 2
INVENTOR.
GENE T. PARISH
BY
Kenway, Jenney, Witter-Hildreth
ATTORNEYS

United States Patent Office 3,020,757
Patented Feb. 13, 1962

3,020,757
MARINE SPEEDOMETER
Gene T. Parish, 34 Valley Road, Concord, Mass.
Filed Feb. 1, 1960, Ser. No. 5,798
13 Claims. (Cl. 73—181)

This invention relates to a novel and improved device for measuring the impact pressure of a liquid during relative movement between the liquid and the device and, more particularly, to such a device which is particularly adapted for use as a marine speedometer.

Marine speedometers in the past have taken various forms, although generally they have all been based upon the same concept, namely the measurement of the impact pressure of the water during movement of the boat through the water. While prior marine speedometers have for the most part proved satisfactory in operation, there have been several disadvantages which it is desirable to overcome. For example, one type has a rather low maximum indicable speed, making it generally suitable for use only on sailboats and precluding effective use on relatively high speed motor boats. Another type provides an indication of the maximum speed obtained but does not provide a continuous indication of speed. Further, the majority of the prior marine speedometers comprise movable parts such as bellows, gear sectors, diaphragms, etc., which may be subject to malfunction or be susceptible to damage caused by rough weather operation of the boat or corrosion.

It is a primary object of my invention to provide a novel and improved device for providing a continuous measurement of the impact pressure of a liquid during relative movement between the liquid and the device, with said device being especially adapted for use as a marine speedometer.

It is another object of my invention to provide a novel and improved device of the type described which will provide accurate measurement of low relative speeds between the liquid and the device while at the same time will provide accurate measurement of relatively high speeds such as the maximum speeds obtained by present day high speed motor boats.

It is still another object of my invention to provide a novel and improved device of the type described which will have no moving parts, therefore providing improved reliability and economy of manufacture, and which at the same time will be rugged so as to provide an extended service life under adverse conditions of environment and use.

The objects of my invention are achieved in a preferred embodiment thereof comprising an elongated transparent tubular member mounted on a boat so as to extend generally vertically. The upper end of the tube is closed, while the lower end of the tube is connected to an impact pressure member or Pitot tube mounted on the boat below the water line thereof and directed so as to sense the impact pressure of the water during movement of the boat. During movement of the boat the height of the water column in the tubular member will vary with the speed of the boat, and the height of the column will, of course, be visible by reason of the transparency of the tubular member. In accordance with my invention, the tubular member is provided with a vent opening intermediate its ends and spaced a predetermined distance above the lower end of the tube. The size of this opening is selected to be smaller than the inlet opening of the Pitot tube but is sufficiently large so that during operation of the boat at speeds wherein the top of the water column is disposed below the vent opening, the height of the water column with vary with boat speed in the same amount as would be the case were the upper end of the tubular member open. However, when the boat speed reaches a value corresponding to a water column height at which the top of the column is above the vent opening in the tubular member, the vent opening will be sealed by the water column, and further increases in speed will require the trapped air above the vent opening to be compressed by the water column in order for the water column to increase in height. Accordingly, for further increases in boat speed, there will be relatively small increases in water column height. In this manner, a water column and Pitot tube arrangement may be used to measure boat speed over a relatively wide range of speeds without requiring the use of an excessively long tubular member for containing the water column. Suitable indicia are provided along the tubular member, so that the height of the water column, which is, of course, an indication of the impact pressure of the water, may be directly related to the boat speed, thus providing a continuous direct reading of the boat speed. A more detailed understanding of this as well as other advantages of my invention may be had by reference to the following description when taken in connection with the accompanying drawing, in which:

FIG. 2 is a fragmentary elevational view, in section, of the upper end of the liquid column containing tubular member of the device of FIG. 1;

FIG. 3 is a fragmentary, elevational view of a modified form of the invention;

FIG. 4 is a fragmentary side elevational view of a boat illustrating one manner of mounting the device of the present invention on a boat and further illustrating an alternative form of the invention;

FIG. 5 is an enlarged fragmentary side elevational view of the speed measuring device of FIG. 4; and FIG. 6 is a fragmentary side elevational view of another alternative form of the invention.

Figure 1:
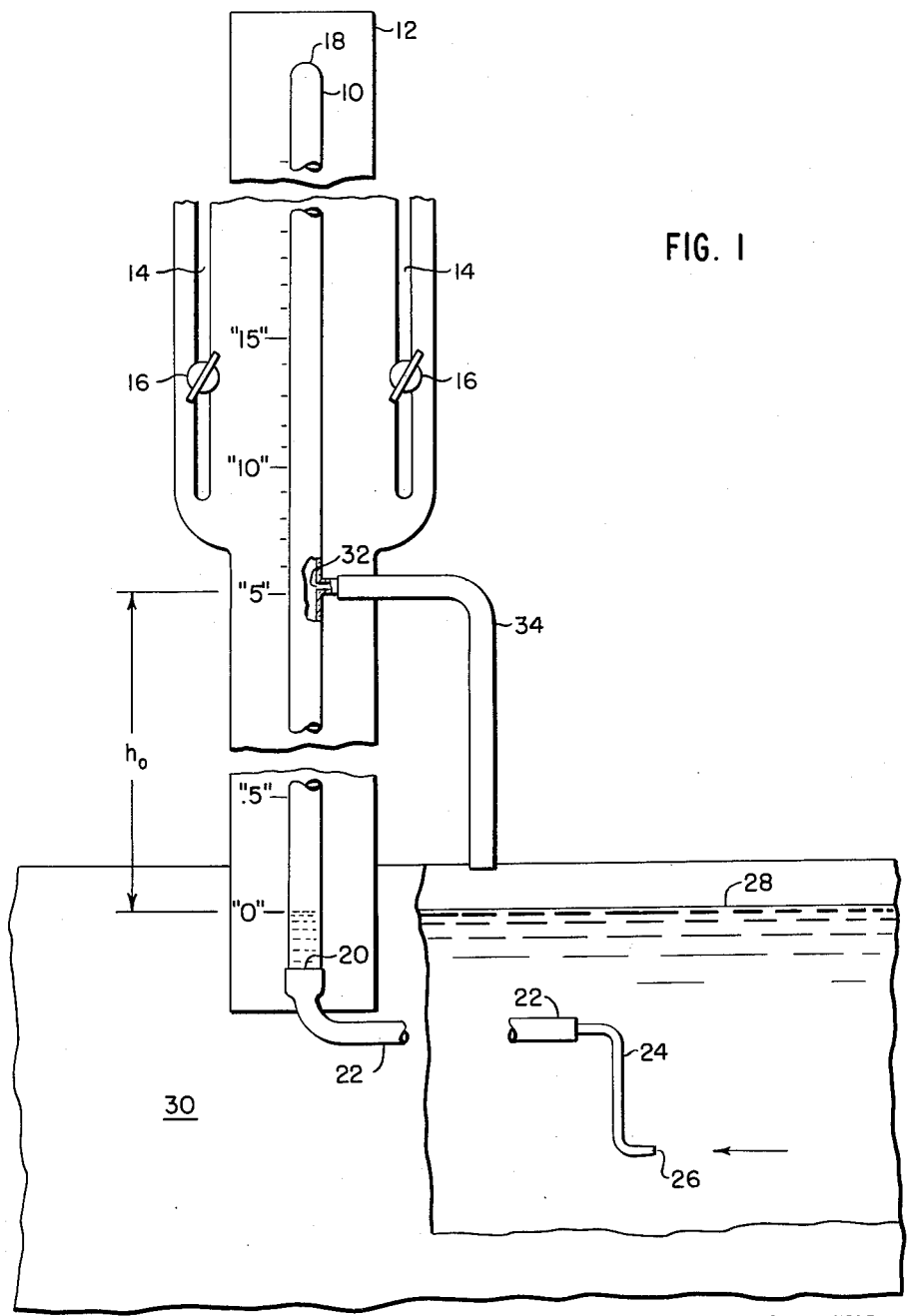
FIG. 1 is an elevational view of an impact pressure measuring device constructed in accordance with the present invention.

With reference to FIG. 1, a preferred embodiment of an impact pressure measuring device constructed in accordance with the present invention comprises an elongated vertically arranged hollow member in the form of a tube 10 suitably secured to a mounting member or support 12. In order to provide for mounting of the tubular member 10 in a generally vertically extending arrangement, the support 12 is provided with elongated slots 14 extending parallel to the tube 10. A pair of thumb screws 16 are receivable in the slots 14 and are threadably engageable with a wall or bulkhead or the like on which it is desired to mount the tube. As will be apparent, the thumb screws may be threaded inwardly to clamp the support 12 to the wall or bulkhead in a plurality of adjusted vertical positions, as permitted by the length of the slots 14. The tubular member 10 is closed at its upper end 18, while the lower end 20 of the tube is open and is connected to a flexible tube 22 leading to a remote impact pressure sensing member or Pitot tube 24 having an inlet opening 26 at one end. The inlet opening 26 of the Pitot tube is disposed below the surface of the liquid 28 flowing through a vessel 30. The inlet opening 26 of the Pitot tube faces in a direction opposite the direction of flow of the liquid, so that during flow of the liquid relative to the vessel and the tube 10 the liquid will be forced upwardly into the tube.

While in the foregoing description the liquid 28 is described as flowing past the tube 10 and Pitot tube 24, it will, of course, be understood that the tube 10 and Pitot tube might be mounted on a boat moving through the water.

The tube 10 is preferably fabricated of a transparent material so that the height of the water column therein may be readily observed visually. Of course, it will be apparent that if desired the tube could be fabricated of an opaque material with only a portion or portions thereof being provided with transparent windows or the like for viewing of the water column. It is to be further understood that the term "transparent" is used herein, and in the appended claims, to denote only that the water column may be visually observed through the wall of the tube 10. Thus, for example, certain translucent materials will fall within the meaning of transparent materials suitable for use in the fabrication of the tube 10. As shown in FIG. 1, numeric indicia are located along the tube 10; and in the specific embodiment of FIG. 1, these indicia represent relative speed in miles per hour of the liquid 28. In order to improve the readability of the device, a small float might be provided in the tube 10 to indicate the water level in the tube.

In accordance with the invention, the tube 10 is provided with a vent opening 32 disposed intermediate the ends of the tube and spaced a predetermined distance from the lower end of the tube. The vent opening 32 is connected to atmosphere by a drain conduit 34 leading back to the vessel 30 but having its open end spaced above the surface of the liquid 28. The area of the vent opening 32 is selected to be smaller than the cross sectional area of the inlet 26 of the Pitot tube. The vent 32 is, however, sufficiently large that, for all intents and purposes, the column of liquid in the tube 10 will behave as if contained in an open ended tube so long as the liquid column is below the vent 32. In this connection, it is preferred that the area of the vent opening 32 be no greater than 25 percent of the area of the inlet opening 26 of the Pitot tube in order to provide satisfactory accuracy of speed measurement.

Assuming that the top of the column of water in the tube 10 is below the vent opening 32, the height of the column of water above the level of the water 28 can be expressed as $$h = C \frac{v^2}{2g}$$

where $h$ is the height in inches of the water column above the water level, $v$ is the relative velocity of the water in inches per second past the tube 24, $g$ is the acceleration due to gravity in inches per second per second, and C is a coefficient whose value is approximately 1. Inasmuch as the portion $2g$ of the above equation is a constant, the formula may be represented as $h = .402v^2$, where $v$ is statute miles per hour. It will, of course, be realized that the height of the water column may be related to knots as well as statute miles per hour. It will be recognized that these formulae represent the formulae for the velocity head of a body of water flowing in an open topped vessel or the like. Also, of course, it will be recognized that the velocity head may be readily converted to water speed or impact pressure. When using an open ended tube to measure the impact pressure or the velocity of flowing water, the height of the water column in the tube is not excessively great when the velocity of the water is relatively low. For example, at 5 m.p.h. the height of the column would be approximately 10.05 inches. However, at 10 m.p.h. the height of the water column would be approximately 40 inches, and at 15 m.p.h. the height of the water column would be approximately 90 inches. Accordingly, it can be seen that excesively long tubes would be required to measure the velocity of water flowing at high speeds, thus rendering this use of an open ended tube impractical for most installations and certainly as a marine speedometer. It will further be recognized that at the lower speeds, say, for example, from 0 to 5 m.p.h., the use of the height of a water column in an open ended tube to measure the velocity of the water provides a very accurate means of measurement while maintaining a practical tube length.

When the height of the water in the tube 10 exceeds the height $h_0$ of the vent opening 32 above the water level of the water 28, the vent opening will be sealed, or, in other words, the top of the water column will not then be exposed to the atmosphere. Accordingly, further increases in the height of the water column in the tube 10 will be resisted by a compression of the air in the tube above the top of the water column. Therefore, at speeds greater than that corresponding to the height $h_0$ of the water column, any increase in velocity of the water will provide a substantially decreased increase in height of the water column. In this manner, higher speeds than those represented by the height $h_0$ may be determined from the height of the water column without resorting to excessively long tubes.

It is, of course, recognized that once the height of the water column exceeds the height $h_0$ a certain amount of water will drain through the tube 34. However, the area of the vent opening 32 is selected to be smaller than the inlet opening 26 of the Pitot tube so that the amount of water drained through the vent opening 32 is sufficiently small that it does not adversely affect the operation of the device. For example, in a specific embodiment of the invention a water column tube 10 having an internal diameter of ⅜ inch was used, with a Pitot tube pickup having an inlet opening of approximately ³⁄₃₂ inch in diameter while the vent opening was approximately ¹⁄₃₂ of an inch in diameter. The vent opening was located at 19.5 inches above the zero reading of the scale, this distance corresponding to a water column height representing approximately 7 m.p.h. Thus, 0 to 7 m.p.h. represented approximately 20 inches on the scale. However, above the vent opening and over a speed range from 7 to 25 m.p.h. only approximately 5 inches of tube length was necessary to contain the water column. It is preferred that there be a substantial volume within the tube 10 and above the maximum reading on the scale. If this results in an undesirably long tube, the upper end of the tube may be provided with an enlarged portion such as shown in FIG. 2, wherein the upper end of the tube is bulbous. In this manner, the desired additional volume of air space may be achieved with a substantial reduction in the height of the tube.

As shown in FIG. 3, where the tube 10 is mounted on a boat within the hull thereof, if desired, the vent opening 32 may be connected to a through hull fitting 38 projecting through the hull 40 of the boat and opening beneath the water line of the boat. If desired, the vent opening 32 may be connected through a length of tubing or the like to drain water overboard above the water line rather than below the water line. Where either of such arrangements is desired, the drain tube 34 is connected to a vent chamber 42 provided with an atmospheric vent opening 44 spaced a substantial distance vertically above the connection of the tube 34 to the chamber. Also, for reasons which will be hereinafter apparent, the chamber 42 is disposed above the vent opening 32 in the tube 10. Another drain tube 46 is connected to the vent chamber 42 at approximately the same height as the tube 34 and connects the vent chamber 42 with the through hull fitting 38, which will, of course, be located below the vent chamber 42. With a speed sufficiently large to cause the water column to rise higher than the vent opening 32 in the tube 10, the drain water will flow through the tube 34 and vent chamber 42 and out through the tube 46 and through the fitting 38. When the water column height drops below the opening 32, the vent opening 44 in the vent chamber will permit the water in the drain tube 34 to drain back into the tube 10; and, of course, any water in the drain tube 46 will drop below the vent chamber 42. In this manner, the vent opening 32 is again open to atmosphere, and thus in the lower speed ranges with the water column height below the vent in the tube 10, the effect of any water in the drain tube 46 will not reflect on the reading of the device.

With reference to FIGS. 4 and 5, there is shown an alternative embodiment of the device of FIG. 1 particularly adapted for use on an outboard motor boat. This modified device comprises an elongated transparent tube 50 which is vertically mounted on the transom of an outboard motor boat hull 52. The tube 50 may be secured directly to the transom by suitable fixtures or may be mounted on a support member such as the tube 10 of FIG. 1, with the support member 12 in turn being suitably mounted to the transom of the boat. Speed indicating indicia may be provided on a member disposed alongside the tube 50 or, as in the preferred embodiment of FIG. 4, the indicia may be provided directly on the tube. A vent opening 54 is provided in the tube 50 and corresponds in function to the vent opening 32 previously described. However, in the case of the embodiment of FIG. 4 the vent opening 32 is not provided with a drain tube but merely opens directly into the atmosphere so that water that passes through the vent opening will merely be discharged directly into the atmosphere. The lower end of the tube 50 is provided with an inlet opening 56 which faces toward the bow of the boat or in the direction of forward movement thereof. While it will be apparent that the inlet opening 56 might be provided by a separate impact pressure sensing member, such as a hollow metal tube suitably connected to the lower end of the tube 50, in the preferred embodiment of FIGS. 4 and 5, the impact pressure sensing member is formed integrally with the tube by forming the lower end of the tube with a right angle configuration terminating in a reduced cross section portion. It is preferred that the tube 50 be mouned at an angle to the longitudinal center line of the boat so that the tube will extend at right angles to the surface of the water when the boat is at the angle to the surface of the water which it assumes during the most usually travelled speed of the boat.

As will be apparent in FIG. 4, the portion of the tube 50 below the top of the transom of the boat will not be readily visible to the boat operator. Accordingly, he may not be able to observe the height of the water column in this region of the tube. However, it will also be noted that the vent opening 54 is located approximately at the top of the transom. The length of the portion of the tube 50 below the vent opening and above the water line will in most outboard motor boat installations be on the order of 20 inches and will thus represent a speed range from 0 to approximately 7 m.p.h. This speed range is not usually of particular importance to the relatively high speeds of outboard motor boats. It is desirable to provide an adjustable mounting for the tube 50 to permit vertical adjustment of the zero marking on the scale relative to the water line of the boat, but such is not absolutely necessary, particularly in connection with high speed boats. It will be apparent that if the distance between the vent opening 54 and the surface of the water decreases, because of increased loading of the boat, for example, there will be an error introduced in the relationship of the indicia on the tube to the actual speed of the boat. However, even if no correction is made for this error, it will also be apparent that this error will be quite small at the higher speeds where the water column is located above the vent opening 54. For example, at a speed of 15 m.p.h. the height of a column of water in an open ended tube would be approximately 95 inches. Accordingly, an initial error of one inch in the height of the column due to increased displacement of the boat would represent only approximately a one percent difference in water column height. Since in the embodiment of FIG. 4 the water column would then be higher than the vent opening 54, it will be apparent that the error would not be detectable in this contracted portion of the scale.

With reference to FIG. 6, there is shown one other alternative embodiment of my invention. This embodiment comprises a tubular member 58 which corresponds to the tubular members 10 and 50 previously described and which is connected at its lower end (not shown) to an impact pressure pickup member (not shown). The upper end of the tube 58 is provided with an end wall 60. A conduit or tube 62 is disposed within the tube 58 and extends longitudinally of the tube 58. The upper end of the tube 62 extends through the end wall 60 so as to open outwardly thereof. The lower end of the tube 62 is spaced between the ends of the tube 58 and provides a vent opening 64 for the tube 58 in the same sense and for the same purpose as the vent openings 32 and 54 previously described. Thus it can be seen that there is provided an elongated hollow member closed at its upper end as in the previously-described embodiments. In the embodiment of FIG. 6, the hollow member is formed by the tube 58, tube 62, and end wall 60 so that the hollow member is circular in cross-section over a portion of its length and annular in cross-section over the remainder of its length. The outer diameter of the vent tube 62 is, of course, substantially smaller than the inner diameter of the tube 58. Further, the area of the opening in the lower end of the tube 62 is, of course, selected to be substantially smaller than the area of the inlet opening in the associated impact pressure pickup member for the reasons described above.

The upper end of the vent tube 62 opens into a chamber 66 formed at the top of the tube 58. The chamber 66 is provided with an atmosphere vent opening 68 in the top thereof, and a drain tube 70 is connected to the chamber through a drain opening in the side of the chamber. In the operation of the embodiment of FIG. 6, the initial water level rise in the tube 58 will be unrestricted due to the venting of the tube 58 by the vent tube 62 and atmosphere opening 68 in the chamber 66. However, when the water level reaches the lower end of the vent tube 62 to seal the vent opening 64 provided by the lower end of the vent tube, further raising of the water level in the tube 58 will require compression of the air in the portion of the tube 58 surrounding the vent tube 62. The drainage through the drain tube 70 may be handled in any of the manners previously described. It is, of course, to be understood that the embodiment of FIG. 6 may be mounted as shown in FIGS. 1 or 4 and that suitable indicia may be provided along the tube 58 which will be transparent over at least a portion of its length.

From the foregoing it will be apparent that there has been provided a novel and improved impact pressure measuring device which is especially adaptable for use as a marine speedometer. The device will accurately measure low relative speeds while at the same time providing a reduced scale measurement of higher speeds without utilizing any moving ports of any sort. The device is simple in design and therefore not likely to malfunction and may be constructed in a rugged manner to withstand severe abuse as well as extended usage under adverse weather conditions. While the device has been described in its various embodiments as being fixed either in a local or remote reading installation, it wall also be apparent that if desired the tube 50 could be hand held.

While the invention has been described in terms of the specific embodiments shown in the accompanying drawings, it will be apparent that various modifications and alterations might be made in the structures shown without departing from the scope of the invention. Accordingly, the foregoing description and accompanying drawings are to be taken only in an illustrative sense and not as limiting the invention.

Having thus described my invention, I claim:

1. A device for providing a continuous indication of the impact pressure of a liquid during relative movement of the liquid with respect thereto, comprising an elongated generally vertically arranged hollow member, at least a portion of the wall of said hollow member being transparent over at least a portion of the length of said member, and an impact pressure pickup member having an inlet passage connected at one end to one end of said hollow member, the other end of said passage opening outwardly of said pickup member, said hollow member being closed at the end thereof opposite said one end, said hollow member further being provided with a liquid and air vent communicating with the interior of said hollow member at a point spaced intermediate from the ends of said hollow member, said vent being smaller in area than the cross section of said other end of said passage in the pickup member.

2. A device for providing a continuous indication of the impact pressure of a liquid during relative movement of the liquid with respect thereto, comprising an elongated generally vertically arranged hollow member, at least a portion of the wall of said hollow member being transparent over at least a portion of the length of said member, and an impact pressure pickup member having an inlet passage connected at one end to one end of said hollow member, the other end of said passage opening outwardly of said pickup member, said hollow member being closed at the end thereof opposite said one end, said hollow member further being provided with a liquid and air vent communicating with the interior of said hollow member at a point spaced intermediate from the ends of said hollow member, said vent being no greater in area than 25 percent of the cross sectional area of said other end of said passage in the pickup member.

3. A device for providing a continuous indication of the impact pressure of a liquid during relative movement of the liquid with respect thereto comprising an elongated vertically arranged hollow member, at least a portion of the wall of said hollow member being transparent over at least a portion of the length thereof, means for mounting the hollow member in a plurality of vertically adjusted positions, the upper end of said hollow member being closed, and an impact pressure pickup member having an inlet passage, one end of said passage being connected to the lower end of the hollow member, the other end of said passage opening outwardly of the pickup member, said hollow member further being provided with a liquid and air vent communicating with the interior of said hollow member at a point intermediate its ends and spaced from said ends and communicating with the atmosphere, said vent being smaller in area than the cross section of the other end of said passage in the pickup member, and means providing indicia spaced along the tubular member.

4. A device for providing a continuous indication of the impact pressure of a liquid during relative movement of the liquid comprising an elongated generally vertically arranged hollow member, at least a portion of the wall of said hollow member being transparent over at least a portion of the length thereof, an impact pressure pickup member having an inlet passage connected at one end to to the lower end of said hollow member, the other end of said passage opening outwardly of the pickup member, said hollow member being closed at the upper end thereof, said hollow member further being provided with a vent opening communicating with the interior of said hollow member at a point spaced intermediate and from the ends of said hollow member, means providing a vent chamber disposed vertically above said vent opening, a conduit connecting said vent opening and vent chamber, said vent chamber being provided with an opening spaced above the connection of said conduit to said chamber and connected to the atmosphere, and a second conduit connected at one end to said vent chamber below the atmosphere connected opening therein, the other end of said second conduit being adapted to be disposed beneath the surface of the liquid the impact pressure of which is being measured, the vent opening in said hollow member being smaller in area than the cross section of said other end of said passage in the pickup member.

5. A device as described in claim 1 in which the upper end of said hollow member is provided with an enlarged portion providing an area of increased volume.

6. A device as described in claim 1 wherein said impact pressure pickup member is an integral part of the lower end of said hollow member.

7. A device for providing a continuous indication of the impact pressure of a liquid during relative movement of the liquid with respect thereto, comprising an elongated generally vertically arranged tubular member, at least a portion of the wall of said tubular member being transparent over at least a portion of the length of said member, and an impact pressure pickup member having an inlet passage connected at one end to one end of said tubular member, the other end of said passage opening outwardly of said pickup member an open ended second tubular member disposed within the first tubular member and extending longitudinally thereof, one end of said second tubular member opening outwardly of said other end of the first tubular member in atmosphere communication, the other end of said second tubular member being spaced intermediate the ends of said first tubular member, said other end of said first tubular member being closed except for said second tubular member opening through said other end, the internal cross sectional area of said other end of said second tubular member being substantially smaller than the cross sectional area of said other end of the passage in the pickup member.

8. A device for providing a continuous indication of the impact pressure of a liquid during relative movement of the liquid with respect thereto, comprising an elongated generally vertically arranged tubular member, at least a portion of the wall of said tubular member being transparent over at least a portion of the length of said member, and an impact pressure pickup member having an inlet passage connected at one end to one end of said tubular member, the other end of said passage opening outwardly of said pickup member, an open ended second tubular member disposed within the first tubular member and extending from said other end of the first tubular member to a point spaced intermediate the ends of said first tubular member, said other end of said first tubular member being closed except for said second tubular member opening through said other end, means forming a chamber having a vent opening connected to atmosphere and having a drain opening, the end of said second tubular member corresponding to said other end of the first tubular member being connected to said chamber, the internal cross sectional area of said other end of said second tubular member being substantially smaller than the cross sectional area of said other end of the passage in the pickup member.

9. In combination, a boat including a hull, and a speedometer comprising an elongated generally vertically extending hollow member disposed within the hull, at least a portion of the wall of said hollow member being transparent over at least a portion of the length of said hollow member, and an impact pressure pickup member disposed at least in part outside of the hull and below the water line of the boat and having a passage connected at one end to the lower end of said hollow member, the other end of said passage opening outwardly of said pickup member and below the water line of the boat and outside the hull, said hollow member being closed at its upper end, said hollow member further being provided with a vent opening connected to atmosphere and opening into said hollow member intermediate said water line and said upper end of the hollow member, said vent opening being smaller in area than the cross section of said other end of said passage in the pickup member, and means providing indicia indicative of boat speed spaced along at least a portion of said hollow member.

10. In combination, a boat including a hull, and a speedometer comprising an elongated vertically extending transparent hollow member closed at its upper end, means for mounting the hollow member on the boat in a plurality of adjusted positions longitudinally of the hollow member, and an impact pressure pickup member having a passage connected at one end to the lower end of said hollow member, the other end of said passage opening outwardly of said pickup member, the pickup member being mounted on the boat below the water line thereof with said other end of said passage in the pickup member disposed outside the hull and below the surface of the water when the boat is floated, the tube further being provided with a vent connected to atmosphere and communicating with said hollow member intermediate said water line and said upper end of the hollow member, said opening being smaller in area than the cross section of said other end of said passage in the pickup member, and means providing speed indicating indicia along at least a portion of said hollow member.

11. In combination, a boat including a hull, and a speedometer comprising an elongated generally vertically extending hollow member closed at its upper end, at least a portion of the wall of said hollow member being transparent over at least a portion of the length of said hollow member, said hollow member further being provided with a vent opening connected to atmosphere and spaced intermediate and from the ends of said hollow member, means providing speed indicating indicia along at least a portion of the length of said hollow member, and an impact pressure pickup member remote from said hollow member and having a passage opening outwardly of said pickup member, said pickup member being mounted on the hull with said other end of said passage outside the boat and disposed below the water line of said boat so that said other end of the passage will be below the surface of the water when the boat is floated, a conduit connecting the other end of said passage to the lower end of said hollow member, the cross sectional area of said other end of said passage being substantially larger than the area of said vent opening.

12. In combination, a boat including a hull, and a speedometer comprising a vertically arranged elongated hollow member closed at its upper end, at least a portion of the wall of said hollow member being transparent over at least a portion of the length of said hollow member, an impact pressure pickup member having a passage connected at one end to the lower end of said hollow member, the other end of said passage opening outwardly of said pickup member, said pickup member being disposed at least in part below the water line of the boat and outside the hull so that said other end of said passage will be disposed below the surface of the water when said boat is floated, said hollow member being provided with a vent opening spaced intermediate and from the ends of said hollow member and being smaller in area than the cross section of said other end of said passage in the pickup member, a vent chamber disposed at least in part above said vent opening, a conduit connected at one end to said vent opening and at the other end to said vent chamber, said vent chamber being provided with an atmosphere opening spaced above the connection of said conduit to the vent chamber, a through hull fitting on said hull disposed below the water line thereof, and a second conduit connecting said through hull fitting to said vent chamber and connected to said vent chamber at a point spaced vertically below the atmosphere opening in the chamber.

13. In combination, a boat including a hull having a transom, and a speedometer comprising an elongated hollow member, at least a portion of the wall of said tubular member being transparent over at least a portion of the length of said hollow member, means mounting the hollow member on said transom, said hollow member extending generally vertically, the upper end of said hollow member being closed, an impact pressure pickup member having a passage one end of which opens outwardly of said pickup member, means connecting the other end of said passage to the lower end of said hollow member in fluid flow communication, said hollow member being provided with a vent opening spaced from and intermediate the ends of said hollow member and disposed substantially above the water line of said boat, said vent opening communicating with the atmosphere and having an area substantially smaller than the cross sectional area of said one end of the passage to the pickup member, and means providing speed indicating indicia along at least a portion of the length of said hollow member above said vent opening.

References Cited in the file of this patent

FOREIGN PATENTS

| | | |
|---|---|---|
| 44,910 | Sweden | May 22, 1917 |
| 696,537 | Great Britain | Sept. 2, 1953 |